US010375577B2

(12) United States Patent
Wang

(10) Patent No.: US 10,375,577 B2
(45) Date of Patent: Aug. 6, 2019

(54) METHOD OF AUTOMATICALLY SELECTING LEGAL COMMUNICATION CHANNEL USED BY MOBILE ELECTRONIC DEVICES AND MOBILE ELECTRONIC DEVICES USING THE SAME

(71) Applicant: HTC Corporation, Taoyuan (TW)

(72) Inventor: Yuan-Kang Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/732,780

(22) Filed: Jun. 8, 2015

(65) Prior Publication Data

US 2015/0373635 A1 Dec. 24, 2015

Related U.S. Application Data

(60) Provisional application No. 62/014,699, filed on Jun. 20, 2014.

(51) Int. Cl.
*H04W 4/02* (2018.01)
*H04W 16/14* (2009.01)
(Continued)

(52) U.S. Cl.
CPC ............ *H04W 16/14* (2013.01); *H04W 4/02* (2013.01); *H04W 4/80* (2018.02); *H04W 48/20* (2013.01);
(Continued)

(58) Field of Classification Search
CPC ....... H04W 48/18; H04W 4/008; H04W 4/02; H04W 16/14; H04W 48/20; H04W 84/12;
(Continued)

(56) References Cited

U.S. PATENT DOCUMENTS 7,602,757 B2 * 10/2009 Jeong .................... H04W 48/16
370/338
2001/0041568 A1 * 11/2001 Hughes ................. H04W 48/08
455/434

(Continued)

FOREIGN PATENT DOCUMENTS

CN 102638799 8/2012

OTHER PUBLICATIONS

"Office Action of Deutsche Counterpart Application", dated Nov. 10, 2015, p. 1-p. 5.

(Continued)

*Primary Examiner* — Marcus Hammonds
(74) *Attorney, Agent, or Firm* — JCIPRNET

(57) ABSTRACT

The disclosure provides a method of automatically selecting a legal range communication channel within an unlicensed spectrum for a mobile electronic device and a mobile electronic device using the same method. In one of the exemplary embodiments, the mobile electronic device would determine a geographical region information in which the mobile electronic device is located; determine a legal range of communication channels within an unlicensed spectrum according to the geographical region information; and select a communication channel from the legal range of communication channels for a communication through a first wireless interface.

6 Claims, 3 Drawing Sheets

(51) Int. Cl.
*H04W 48/20* (2009.01)
*H04W 4/80* (2018.01)
*H04W 84/12* (2009.01)
*H04W 88/06* (2009.01)
*H04W 48/16* (2009.01)

(52) U.S. Cl.
CPC ............ *H04W 48/16* (2013.01); *H04W 84/12* (2013.01); *H04W 88/06* (2013.01)

(58) Field of Classification Search
CPC ....... H04W 88/06; H04W 92/10; H04W 8/02; H04W 8/06; H04W 88/08
USPC .......................................................... 455/434
See application file for complete search history.

(56) References Cited

U.S. PATENT DOCUMENTS

| | | | | |
|---|---|---|---|---|
| 2002/0082022 A1* | 6/2002 | Johnson | ................ | H04W 72/02 455/450 |
| 2004/0090944 A1* | 5/2004 | Ueno | ..................... | H04W 4/02 370/338 |
| 2004/0127240 A1* | 7/2004 | Li | ........................ | H04W 48/18 455/500 |
| 2004/0223477 A1* | 11/2004 | Iwasaki | ................ | H04W 48/16 370/338 |
| 2005/0147070 A1* | 7/2005 | Cromer | ................ | H04W 48/20 370/338 |
| 2006/0252418 A1* | 11/2006 | Quinn | ................... | H04W 16/10 455/423 |
| 2007/0099660 A1* | 5/2007 | Bhesania | ............ | H04L 41/0809 455/557 |
| 2008/0002638 A1* | 1/2008 | Saarela | ................ | H04W 88/06 370/338 |
| 2009/0067398 A1* | 3/2009 | Green | ................... | H04W 48/16 370/338 |
| 2011/0090887 A1* | 4/2011 | Kim | ...................... | H04W 48/16 370/338 |
| 2012/0076045 A1* | 3/2012 | Pease | ................ | H04W 72/0453 370/254 |
| 2013/0223357 A1 | 8/2013 | Jones et al. | | |
| 2013/0303232 A1* | 11/2013 | Thomas | .............. | H04W 52/146 455/550.1 |
| 2014/0226572 A1* | 8/2014 | Thota | .................... | H04W 16/14 370/329 |
| 2015/0071268 A1* | 3/2015 | Kennedy | ................. | H04W 8/08 370/338 |
| 2015/0312697 A1* | 10/2015 | Mueck | ................... | H04W 4/001 455/418 |

OTHER PUBLICATIONS

"Office Action of China Counterpart Application," dated Jan. 31, 2018, p. 1-p. 8.

* cited by examiner

METHOD OF AUTOMATICALLY SELECTING LEGAL COMMUNICATION CHANNEL USED BY MOBILE ELECTRONIC DEVICES AND MOBILE ELECTRONIC DEVICES USING THE SAME

CROSS REFERENCE TO RELATED APPLICATION

This application claims the priority benefit of U.S.A. provisional application Ser. No. 62/014,699, filed on Jun. 20, 2014. The entirety of the above-mentioned patent application is hereby incorporated by reference herein and made a part of specification.

TECHNICAL FIELD

The disclosure is directed to a method of automatically selecting a legal communication channel of a region used by a mobile electronic device and a mobile electronic device using the same method.

BACKGROUND

Conventionally, a mobile electronic device could be used to provide its user with the benefit of mobility, flexibility, and versatility to not only communicate with each other but also to provide various functionalities to its users including entertainment, productivity, information inquiry, and so forth. A mobile electronic device may could be, for example, a smart phone, personal digital assistant (PDA), a smart watch, a laptop, a tablet, a pager, a portable video gaming device, a musical device, a scanner, a printer, a camera, or the likes. A conventional mobile electronic device may communicate with each other over a wireless hardware interface such as a 3G interface.

Currently, a mobile electronic device could connect to another device by using peer to peer communication (P2P) means such as through Bluetooth, Wi-Fi, Wi-Fi Direct, near field communication (NFC), and other related protocols. When a mobile electronic device is connected to another mobile electronic device, any one of the pairs of mobile electronic device may control another device by using any one or a combination of the aforementioned P2P communication means. Also, similarly, user data could be transmitted from one mobile electronic device to be received another mobile electronic device.

In order to utilize the aforementioned P2P communication means to transmit control signals or data wirelessly, the communication has to occur over a wireless channel in a radio frequency spectrum. However, not all the radio frequency spectrums are free to use by users of a mobile electronic device although most countries have allocated licensed spectrum. One potential difficulty that has to be addressed in the future is that there is currently no uniformity in licensed spectrums allocated by different governments. In other words, a radio frequency spectrum could be free to use in one country but could be proprietary as a user travels across a national border.

Therefore, the aforementioned difficulty may need to be resolved automatically by a mobile electronic device that uses a P2P communication medium in order to avoid legal problems when a person of the mobile electronic device travel to different parts of the world.

SUMMARY OF THE DISCLOSURE

Accordingly, the disclosure is directed to a method of automatically selecting a legal communication channel of a region used by a mobile electronic device and a mobile electronic device using the same method.

In one of the exemplary embodiments, the present disclosure is directed to a method of automatically selecting a legal communication channel of a region used by a mobile electronic device. The method would include at least but not limited to determining a geographical region information in which the mobile electronic device is located; determining a range of communication channels according to the geographical region information; and selecting a communication channel from the range of communication channels for a communication through a first wireless interface.

In one of the exemplary embodiment, the disclosure is direct to a mobile electronic device that includes at least but not limited to a location determining module; a first wireless interface; and a processing unit that controls the location determining module and the first wireless interface. The processing unit is configured at least for: determining a geographical region information in which the mobile electronic device is located by using the location determining module; determining a range of communication channels according to the geographical region information; and selecting a communication channel from the range of communication channels for a communication through a first wireless interface.

In one of the exemplary embodiment, the disclosure is direct to a non-transitory storage medium containing computer readable programs which are loaded into a processor unit of a mobile electronic device to perform functions comprising: determining a geographical region information in which the mobile electronic device is located; determining a range of communication channels according to the geographical region information; and selecting a communication channel from the range of communication channels for a communication through a first wireless interface.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
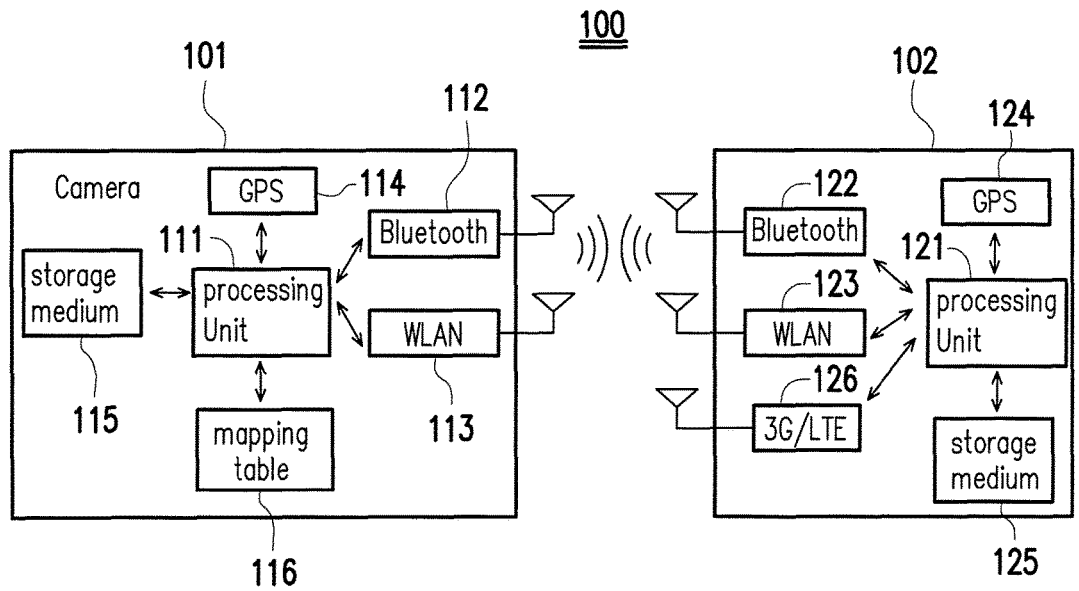
FIG. 1 is a block diagram that illustrates an exemplary electronic system that automatically determines a regionally appropriate channel range of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

At the present, mobile electronic devices may communicate with each other by using peer to peer communication (P2P) means such as through Bluetooth, Wi-Fi, Wi-Fi Direct, near field communication (NFC), and other related protocols. When a first mobile electronic device is connected to a second mobile electronic device, control signalling as well as data payloads could be transmitted across the P2P interfaces. Control signalling could be transmitted from a first mobile electronic device to a second mobile electronic device to allow the first mobile electronic device to remote control the second mobile electronic device. For example, the first mobile electronic device may request for the second mobile electronic device to transmit user data or multimedia files to the first mobile electronic device.

For example, if the first mobile electronic device is a mobile phone and the second mobile electronic device is a digital camera, the mobile phone may request for the digital camera to transmit multimedia files such as captured photographs or videos across their respective wireless interfaces, such as Wi-Fi Direct interfaces for example. However, while this inconspicuous operation of transmitting data over a Wi-Fi Direct channel may appear to be harmless, it might in some cases break a law of a country as the wireless communication transpires in an impermissible frequency band. Although different countries apply their own regulations to the allowable 5 GHz Wi-Fi channels, a group of channels that is legal for one country might not be legal for another country. For example, although some of the channels within the range of 36~48 of the allowable 5 GHz Wi-Fi channels are allowed in the European Union (EU), but none of them would be allowed in Taiwan; channels within the range of 149~165 has been allowed in the US, but none of these channels is allowed in Japan and the EU. Therefore, when a user transports one's camera and mobile device to travel from country to country, the user might be unaware that an illegal 5 GHz Wi-Fi channel has been used to operate these devices.

To address the aforementioned difficulty, the disclosure proposes a method and a device using the same method to automatically determine a legal communication channel range of a region. By determining, from unlicensed radio frequency spectrum, a legal communication range which is region specific, a channel could be selected from the legal communication range in order for wireless interfaces to legally operate with a specific region. In addition to the proposed method and device, the disclosure provides several exemplary embodiments.

In one of the exemplary embodiments, the disclosure proposes for a first electronic device to retrieve information about a specific nation, territory, or region such as a country code from a network operator, and then the country code would be delivered from the first electronic device to a second electronic device over a legal wireless protocol. This legal wireless protocol would be based on a standard that is legal in all or most countries. After the country code has been delivered to the second electronic device, the second electronic device would then lookup the country code in a mapping table to determine an allowable channel range for that particular country. The second electronic device would then setup an access point (AP) having an allowable channel range. The first electronic would then able to connect to the AP using a channel in the allowable range.

In one of the exemplary embodiments, the disclosure proposes for the first electronic device to obtain a geographical coordinate from a positioning system. The geographical coordinate would be used to obtain a country code that corresponds to the geographical coordinate. The country code could be obtained from the geographical coordinate by using a mapping table. After the country code is known, the ranges of allowable channels corresponding to the country code could also be known. The geographical coordinate would allow the first electronic device to set up the Wi-Fi to form a Wi-Fi AP by using channels within the allowable channel ranges of the country code and by avoiding channels that would have been illegal in a location that corresponds to the geographical coordinate.

In one of the exemplary embodiments, the disclosure proposes for the first electronic device to obtain ranges of legal channels with a unlicensed spectrum of a country based on a hint left by an AP that is already setup in the country. More specifically, after a scan for an external AP has been performed, if one or several 5 GHz AP(s) has been found from a beacon, the first electronic device would obtain the channel information from the beacon. Based on the channel information, the first electronic device would be able to known the entire channel group that the channel belongs to. The first electronic device would then be able to setup a Wi-Fi AP that has the allowable channel range of the channel group. FIG. 1~FIG. 5 below further elaborates the abovementioned inventive concept of the present disclosure.

FIG. 1 is a block diagram that illustrates an exemplary electronic system 100 that automatically selects a regionally appropriate channel of the present disclosure. The system may include at least but not limited to a first electronic device that could be wirelessly connected to a second electronic device. The first electronic device could be a digital camera 101, and the second electronic device could be a mobile phone 102.

The camera 101 would include at least but not limited to a processing unit 111 electrically connected to a Bluetooth interface 112, a WLAN 113 interface, a GPS module 114, non-transitory a storage medium 115, and a mapping table 116 that can be a part of the storage medium. The processing unit 111 may include one or more central processing units electrically coupled to one or more controllers and would perform all or most controlling and processing functions related to the method of selecting a communication channel range for mobile electronic devices. The functions of the processing unit 111 could be implemented by using programmable units such as a micro-processor, a micro-controller, a DSP chips, FPGA, etc. The functions of the processing unit 111 may also be implemented with separate electronic devices or ICs, and the processing circuit may also be implemented with either hardware or software.

The Bluetooth interface 112 may include a Bluetooth transceiver that implements a version of the Bluetooth protocols such as the Bluetooth Low Energy (BLE) protocol. The WLAN interface 113 would provide a wireless communication interface according a version of the Wi-Fi protocols and/or Wi-Fi Direct protocols. The GPS module 114 would include a GPS receiver that may receive location information in terms of a longitudinal coordinate and a latitudinal coordinate. Alternatively, the GPS module 114 could be replaced by a more general location and positioning module that is used to obtain the location of the digital camera 101. The non-transitory storage medium 115 would provide temporary or permanent storage and may include computer readable codes which could be loaded into an electronic device to execute the method of selecting a communication channel range for mobile electronic devices. The storage medium could also be stored externally in a server or cloud storage. The mapping table 116 may contain a lookup table that may provide information related to at least one of legal communication channels based on a specific country, a specific country based on a GPS coordinate, and different discrete channel groups.

The mobile phone 102 may include at least but not limited to a processing unit 121 that is electrically connected to a Bluetooth interface 122, a WLAN interface 123, a 3G/LTE wireless transceiver 126, a GPS module 124, and a non-transitory storage medium 125. The supported functions of each of the processing unit 121, Bluetooth interface 122, WLAN interface 123, the GPS module 124, and the non-transitory storage medium 125 would include at least those that were described for the digital camera 101. The 3G/LTE wireless transceiver 126 may provide a wireless connection to a base station through which the mobile phone 102 may make a phone call or access the internet.

Figure 2:
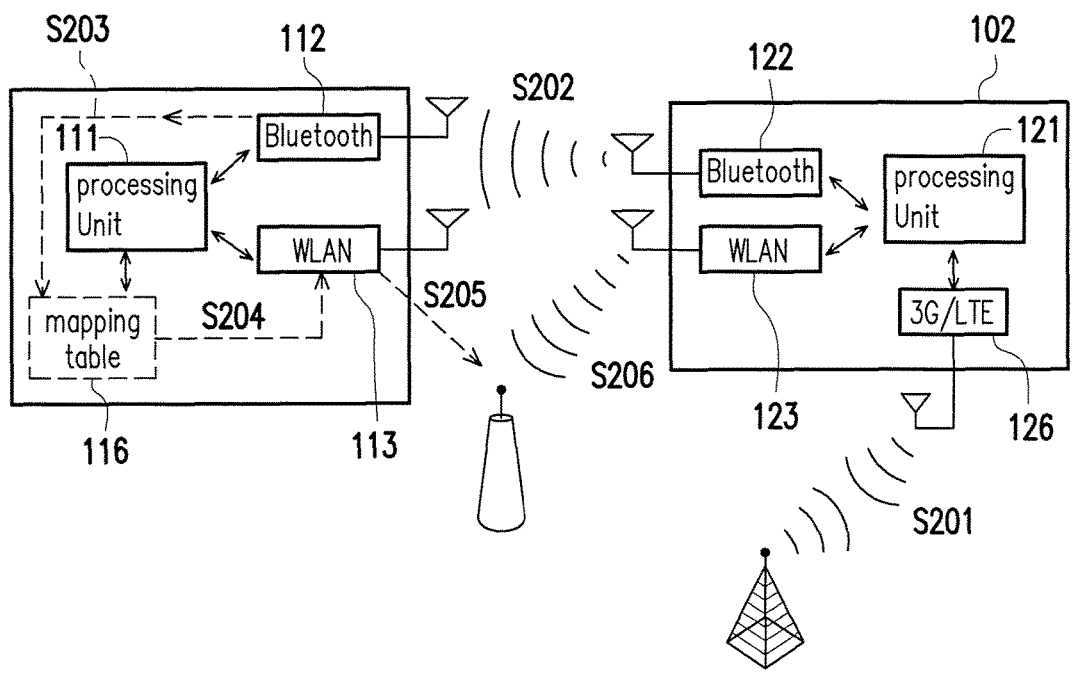
FIG. 2 illustrates a first exemplary embodiment of the method of selecting a communication channel of the present disclosure.

FIG. 2 illustrates a first exemplary embodiment of the method of automatically selecting a legal communication channel of a region of the present disclosure. In step S201, the processing unit 121 may control the 3G/LTE transceiver 126 to communicate with a base station to obtain a country code from a network operator. The country code would represent a specific country. In step S202 the processing unit 121 may control the Bluetooth or BLE interface 122 of the mobile phone 102 to transmit the country code to be received by the Bluetooth or BLE interface 112 of the camera 101. In step S203, the processing unit 111 of the camera 101 may access the mapping table 116 to acquire allowable channel ranges of the country that corresponds to the country code. The mapping table 116 would contain information of all the allowable channel ranges of all or most countries. In step S204, the processing unit 111 may initiate a Wi-Fi interface by controlling the allowable channel ranges to be delivered to the WLAN interface 113. In step S205, the WLAN 113 interface may set up a Wi-Fi AP by only using the allowable channel ranges of the 5 GHz Wi-Fi spectrum for the particular country code. In step S206, the processing unit 121 may control the WLAN 123 of the mobile phone 102 to connect to the Wi-Fi AP using one of the channels of the allowable channel ranges of the 5 GHz Wi-Fi spectrum provided by the camera 101.

The country code could be a conventional calling code used to dial international numbers. Alternatively, a country code could be substituted by digital information that represents the country code or any other geographical information. A country code may represent a sovereign country or a territory of a sovereign country.

Figure 3:
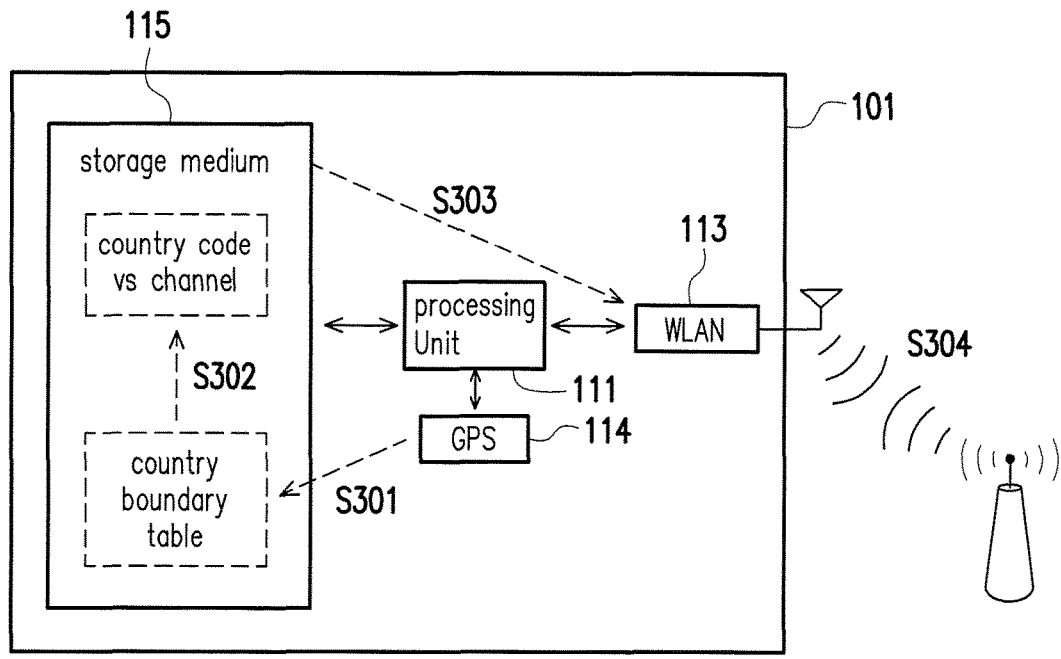
FIG. 3 illustrates a second exemplary embodiment of the method of selecting a communication channel of the present disclosure.

FIG. 3 illustrates a second exemplary embodiment of the method of automatically selecting a legal communication channel of a region of the present disclosure. In step S301, the processing unit 111 of the camera 101 would control the GPS module 114 to obtain a geographical coordinate in terms of a longitudinal coordinate and a latitudinal coordinate or in terms of coordinates of a map, and the processing unit 111 may access a Country Boundary Table stored within the storage medium 115 to derive a country code from the geographical coordinate. Alternatively, the GPS module 114 could be replaced by a location and positioning module within the processing unit 111 to be used to obtain location information. For example, the necessary location information or country code could be obtained externally through the WLAN 113 interface. In step S302, the processing unit 111 may access a Country Code vs Channel lookup table within the storage medium 115 to lookup allowable channel ranges which correspond to the country code. The Country Code vs Channel lookup table specifies the relationship between each country code and legal radio frequency spectrums that is free to access. The allowable channel (CH) ranges may include a plurality of ranges of allowable channels.

For example, if the country code is found to represent the United States (US), and by looking up the plurality of ranges of allowable channels of US from the Country Code vs Channel table, the legal channels of US would be, for example, CH 36, 40, 44, 48~116, 132~165, and so forth. In step S303, the processing unit 111 would transmit over the WLAN interface 113 the plurality of ranges of allowable channels to be received by a remote device. In step S304, the WLAN interface 113 would set up a Wi-Fi AP to only make available the channels within the allowable ranges. An external device such as the mobile phone 102 may be able to connect to the Wi-Fi AP by using one of these channels within the allowable ranges. In other words, when a need arises to switch a wireless channel, the channel would not be switched to any channel that is outside of the ranges of legal channels.

Alternatively, the digital camera 101 may transmit information regarding the channels within the allowable range to an external source such as a mobile phone 102 so that the digital camera 101 may connect to an external AP to be set up by the mobile phone 102 by using only the channels within allowable channel ranges.

Alternatively, instead of relying on the GPS 114 module to obtain positioning information, a location and positioning module within the processor 111 could be relied upon to obtain positioning information. For example, the local and positioning module could be used to calculate a current positioning information based on signals received from base stations. The current positioning information could be calculated from signals obtained from 3 base stations or the combination of at least 3 base station(s) and or Wi-Fi station(s). The positioning information could be represented in terms of a longitudinal and latitudinal coordinate or could be represented in terms of a coordinate of a map.

Figure 4:
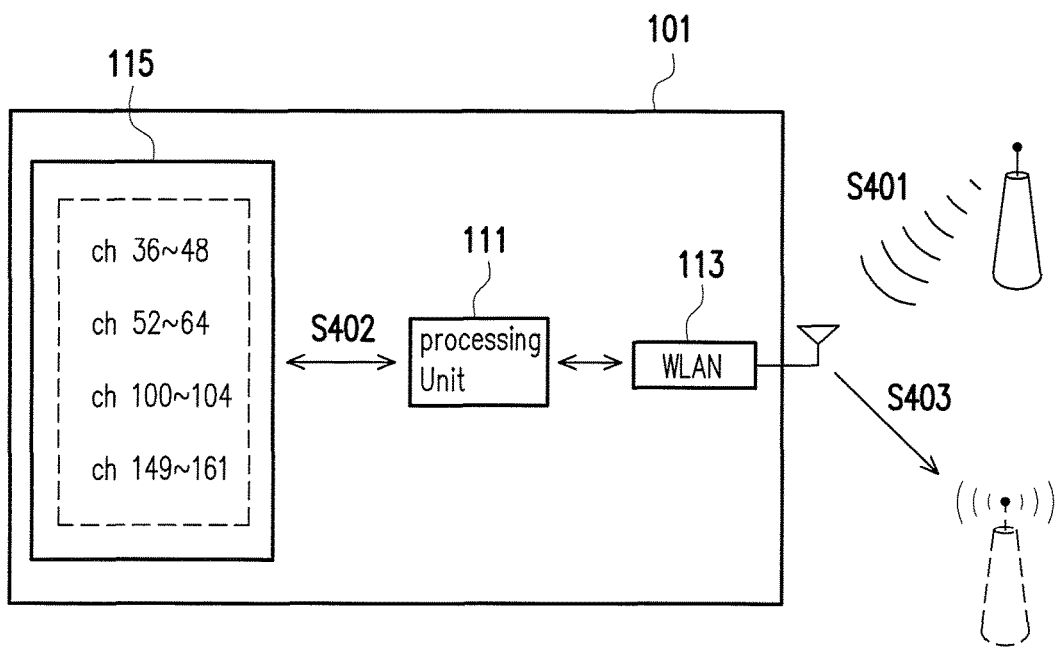
FIG. 4 illustrates a third exemplary embodiment of the method of selecting a communication channel of the present disclosure.

FIG. 4 illustrates a third exemplary embodiment of the method of automatically selecting a legal communication channel of a region of the present disclosure. In step S401, the processing unit 111 of the camera 101 may control the WLAN interface 113 to perform a passive scan for a beacon signal of an external AP that is nearby. Assuming that an external AP has been found, the WLAN interface 113 would be able to obtain channel information of a first channel provided by the external AP such as at least one of the channel numbers and the center frequency of the channel. In response to obtaining the channel information, in step S402, the processing unit 111 would access a Channel Range lookup table stored within the storage medium 115 of the camera 101 to obtain the ranges of allowable channels within which the first channel would belong to. The processing unit 111 would then control the ranges of allowable channels to be transmitted to the WLAN 113 interface. Typically for a country, a channel range would be entirely available or unavailable. Therefore, by knowing that at least one channel is available from an external AP, the processing unit 111 of the camera 101 would be able to assume that the entire range of a group of channels would be available within the country of which the external AP is situated in. In step S403, the WLAN interface 113 would be able to setup a Wi-Fi AP to only make available the channels within the allowable ranges. An external device such as the mobile phone 102 may be able to connect to the Wi-Fi AP by using one of these channels within the allowable ranges.

For example, the ranges of allowable channel may include at least four groups, namely, CH 36~48, CH 35~64, CH 100~140, and CH 149~161. If the channel detected from the external AP falls into the group of CH 36~48, which is the first range of allowable channels, the WLAN interface 113 would setup a Wi-Fi AP to only make available the first range of allowable channels, which is CH 36~48, for another external device to connect to.

The WLAN 113 may scan for a second channel of a second external AP that is different from the above mentioned external AP. If a second channel that belongs to a different group or a second range of allowable channels has been found from the second external AP, the camera 101 may know that the second range of allowable channels is also available for the particular country of which is the external AP is situated in. The second range of allowable channels could be recorded within the storage medium 115 of the camera 101. The WLAN interface 113 could then setup the Wi-Fi AP by making available only the first range and the second range of allowable channels for another external device to connect to. This process could be repeated for additional external AP's. Each time by connecting to other AP's in addition to the second external AP and/or the first external AP, the camera 101 would be able to obtain more accurate information regarding the allowable channel ranges that is legal to use in a particular country.

Figure 5:
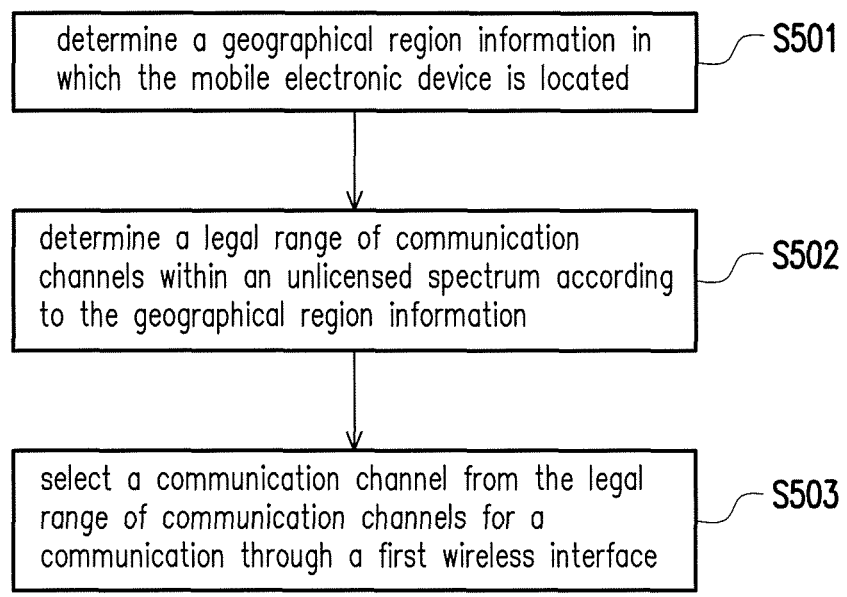
FIG. 5 illustrates a proposed method of selecting a communication channel in accordance with one of the exemplary embodiments of the disclosure.

FIG. 5 illustrates a proposed method of automatically selecting a legal communication channel of a region from the perspective of a mobile electronic device in accordance with one of the exemplary embodiments of the disclosure. In step S501, the mobile electronic device would determine a geographical region information in which the mobile electronic device is located. The geographical region could be a sovereign country or a territory of a non-sovereign country. In step S502, the mobile electronic device would automatically determining a legal range of communication channels within an unlicensed spectrum of a region according to the geographical region information of the region. For example, the range of communication range could be determined by using a mapping table and the geographical region previously determined. In step S503, the mobile electronic device would select a communication channel from the legal range of communication channels for a communication through a first wireless interface. In other words, if a change of communication channel is necessary, a channel within the range of communication determined in step S502 would be selected.

In one of the exemplary embodiments, the determining of the geographical region information in which the mobile electronic device is located may include receiving, through a second wireless interface, a country code that represents the geographical region in which the mobile electronic device is located. The second wireless interface could be a hardware interface that supports a version of the 3G/LTE communication standard.

In one of the exemplary embodiments, the mapping table may define a relationship between the country code and a range of legal communication channels in unlicensed radio frequency spectrum.

In one of the exemplary embodiments, the mobile electronic device may determine, from a mapping table, the legal range of communication channels based their relationships with the country code as recorded in the mapping table. The mobile electronic device may transmit the country code over a third wireless interface, which could be a Bluetooth interface, and the mobile electronic device may then set up a Wi-Fi interface by using the first wireless interface to communicate using the range of legal communication channels in the unlicensed spectrum. The Wi-Fi interface could be an Wi-Fi access point.

In one of the exemplary embodiments, the mobile electronic device may determine the geographical region in which the mobile electronic device is located at least by using a location determining module to obtain a geographical coordinate and subsequently determining the geographical region according to the geographical coordinate and a boundary table. The location determining module could be, for example, a GPS system, and the boundary table could be, for example, a world map.

In one of the exemplary embodiments, the mobile electronic device may determine, for the previously determined geographical region, a legal range of communication channels that are not only supported by the first wireless interface of the mobile electronic device but also are legal for the geographical region within the unlicensed spectrum. The determining could be accomplished by using a mapping table. The range of communication channels that are supported by the first wireless interface of the mobile electronic device and are legal for the geographical region in unlicensed frequency spectrum could be determined by using a Country Code vs unlicensed channel mapping table which describes ranges of unlicensed communication channels corresponding to each country code.

In one of the exemplary embodiments, the mobile electronic device may transmit the legal range of communication channels over the first wireless interface, set up a Wi-Fi connection of the first wireless interface, and subsequently receive a transmission by only using the communication channel from the legal range of communication channels as determined.

In one of the exemplary embodiments, the mobile electronic device may perform a passive scan over an unlicensed spectrum to determine a wireless channel and may automatically determine the legal range of legal communication channels in an unlicensed spectrum according to the wireless channel and the mapping table.

In one of the exemplary embodiments, the mapping table at least defines a first channel range and a second channel range as each of the first channel range and the second channel range may include a plurality of different channels. The first channel range is different from the second channel range. The mapping table could also define a third channel range, a fourth channel range, and beyond, and each channel range may have at least one channel.

In one of the exemplary embodiments, the mobile electronic device may determine whether the aforementioned wireless channel determined during scan falls within any one of the channel range as defined by the mapping table. When the wireless channel falls within the first channel range defined by the mapping table, then the channels within the first channel range could be determined to be legal channels that are in an unlicensed spectrum. When the wireless channel falls within the second channel range, then the channels within the second channel range could be determined to be legal channels that are in an unlicensed spectrum. The same rule may apply to the third channel range, the fourth channel range, and beyond.

In view of the aforementioned descriptions, the disclosure is suitable for being used in peer to peer communications between at least one electronic mobile device and at least one digital camera such that an electronic mobile device and an camera may communicate over unlicensed spectrum even if a user of these devices transport them across national border. These devices would automatically determine legal channels within the unlicensed spectrum and avoid channels that are proprietary.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of automatically selecting a communication channel of a region applicable for a mobile electronic device, the method is performed by the mobile electronic device and comprising:
   receiving, through a first wireless interface, a country code that represents a geographical region information;
   in response to receiving the country code, accessing a channel range lookup table to obtain a legal range of communication channels according to the country code;
   setting up a Wi-Fi access point using a second wireless interface by using a first channel of the legal range of communication channels so as to make the Wi-Fi access point connectable by an external device through the legal range of communication channels; and
   switching the Wi-Fi access point from using the first channel to using a second channel of the legal range of communication channels without receiving another country code through the first wireless interface in response to a need for changing the communication channel.

2. The method of claim 1, wherein the channel range lookup table comprises a plurality of channel groups of only an unlicensed spectrum, wherein the plurality of channel groups comprises a first channel group and a second channel group.

3. The method of claim 2, wherein accessing the channel range lookup table to obtain the legal range of communication channels according to the country code comprising:
   accessing the channel range lookup table to determine which channel group of the plurality of channel groups the country code corresponding to;
   allowing only channels of the first channel group as the legal range of communication channels by presuming that the channels of the first channel group are all legal in response to the country code is determined to correspond to the first channel group; and
   allowing only channels of the second channel group as the legal range of communication channels by presuming that the channels of the second channel group are all legal in response to the country code is determined to correspond to the second channel group.

4. The method of claim 3 further comprising:
   receiving, through the first wireless interface, a second country code after relocating to a different region;
   determining, from the plurality of channel groups, one channel group in which the second country code corresponds to by accessing the channel range lookup table; and
   determining only channels of the one channel group as the legal range of communication channels.

5. A mobile electronic device comprising:
   a first wireless interface;
   a second wireless interface; and
   a processing unit that controls the first wireless interface and the second wireless interface, the processing unit is configured at least for:
   receiving, through the first wireless interface, a country code that represents a geographical region information;
   in response to receiving the country code, accessing a channel range lookup table to obtain a legal range of communication channels according to the country code;
   setting up a Wi-Fi access point using the second wireless interface by using a first channel of the legal range of communication channels so as to make the Wi-Fi access point connectable by an external device through the legal range of communication channels; and
   switching the Wi-Fi access point from using the first channel to using a second channel of the legal range of communication channels without receiving another country code through the first wireless interface in response to a need for changing a communication channel.

6. A non-transitory storage medium containing computer readable programs which are executed by a processor unit of a mobile electronic device to perform functions comprising:
   receiving, through a first wireless interface, a country code that represents a geographical region interface;
   in response to receiving the country code, accessing a channel range lookup table to obtain a legal range of communication channels according to the country code;
   setting up a Wi-Fi access point using a second wireless interface by using a first channel of the legal range of communication channels so as to make the Wi-Fi access point connectable by an external device through the legal range of communication channels; and
   switching the Wi-Fi access point from using the first channel to using a second channel of the legal range of communication channels without receiving another country code through the first wireless interface in response to a need for changing a communication channel.

\* \* \* \* \*